Sept. 10, 1963
R. F. RILEY
3,103,613
MOTOR DRIVE CONTROL APPARATUS
Filed Jan. 2, 1959
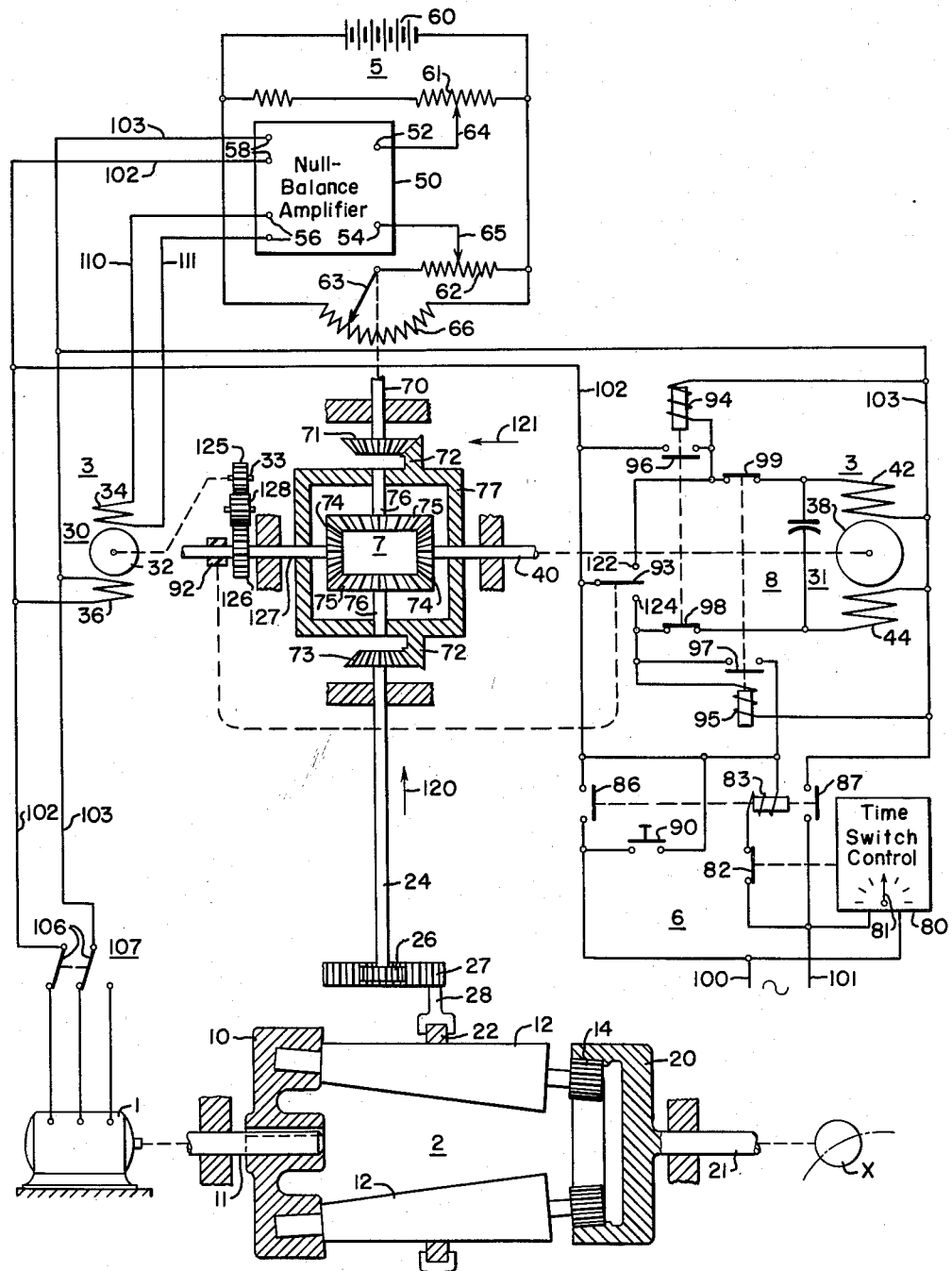
WITNESSES:
Bernard R. Gieguey
James H. Young
INVENTOR
Robert F. Riley
BY R.M.Brodahl
ATTORNEY Patented Sept. 10, 1963

3,103,613
MOTOR DRIVE CONTROL APPARATUS
Robert F. Riley, Ellicott City, Md., assignor to Westinghouse Electric Corporation, East Pittsburgh, Pa., a corporation of Pennsylvania
Filed Jan. 2, 1959, Ser. No. 784,679
3 Claims. (Cl. 318—11)

This invention relates to speed control apparatus and more particularly to apparatus for controlling the speed of an actuated member whereby same may be caused automatically to traverse a preselected distance in a preselected time.

The illustrative embodiment of the invention as set forth herein emphasizes its employment in conjunction with the control of the speed of travel of a member traveling along a circular path whereby such member may be made to traverse a preselected arcuate distance in a preselected interval of time.

An object of the present invention relates to the provision of the above type of control apparatus.

A further object of the present invention relates to the provision of such control appparatus as particularly adapted for controlling the travel speed of a radioactive source material holder in a rotational therapy unit such as disclosed and described in copending patent application Serial No. 777,042, filed November 28, 1958, and assigned to the assignee of the present invention.

Another object of the present invention relates to its adaption for controlling the travel speed of an actuated member whereby same is automatically made to traverse a selected distance in a selected interval of time according to manually-preselected control settings effected by an operator.

In accordance with the preceding object of the invention, it is still a further object of the invention to provide for such controlling of travel speed with respect to the aforementioned radioactive source material holder in a rotational therapy unit.

Other objects and advantages of the invention will become apparent from the following detailed description of the invention when taken in connection with the accompanying drawing, in which the single FIGURE is a schematic representation showing in simplified form mechanical and electrical details with respect to the control apparatus embodying the invention.

Referring now to the drawing, the novel control apparatus comprises in general motor means 1 operatively connected with a member X to be actuated; variable speed transmission means 2 interposed between the motor means 1 and the member X to be actuated; motor means 3 for adjusting the speed setting of the variable speed transmission means 2; and circuit means 5 for controlling operation of the motor means 3 according to time-distance settings.

Additional features of the invention relate to the inclusion of circuit means 6 for automatically effecting termination of operation of the motor means 1, motor means 3, and circuit means 5 after a preselected interval of time; and means including a differential gear mechanism 7 and circuit 8 enabling the motor means 3 to take the form of pilot and slave units operatively associated in common with the variable speed transmission means 2.

The motor means 1 is preferably reversible and of such capacity as is compatible with the work requirements concerned with actuating the member X such as the exemplified radioactive source material holder, through the variable speed transmission means 2.

The variable speed transmission means 2, for sake of illustration, preferably may be of the type manufactured and sold by Graham Transmissions, Inc. and which comprises in general a rotary member 10 driven by an input shaft 11 which may be common to the motor means 1 and coupled thereto; a plurality of circumferentially spaced-apart tapered rollers 12 journaled at one end in the rotary member 10 and carrying at opposite ends respective pinions 14 secured for rotation therewith; a ring gear member 20 cooperative with the pinions 14 for driving an output shaft 21 adapted to be connected through the medium of means (not shown) to the member X to be actuated; a control ring 22 encircling the rollers 12; and means including a speed control shaft 24, such as a pinion 26, rack 27 and arm 28, for actuating the control ring 22 to different longitudinal positions along the rollers 12.

In operation of the variable speed transmission means 2, the taper rollers 12 are rotated in unison with the input shaft 11 through the medium of the rotary member 10 while centrifugal force created by rotation of the rollers about the axis of the input shaft 11 urges such rollers into frictional contact with the non-rotatable control ring 22 and causes each to rotate about its own axis and thereby effect driving of the output shaft 21 through the medium of the ring gear 20 and the pinions 14 secured for rotation with such rollers. By adjustment of the longitudinal position of the control ring 22 with respect to the rollers 12, through the medium of the speed control shaft 24, pinion 26, rack 27 and arm 28, the speed of rotation of the tapered rollers 12 about their own axes relative to the speed of rotation of input shaft 11 may be made to change, thereby varying the speed of the output shaft 21 relative to the speed of the input shaft 11 which may be constant.

The motor means 3 comprises a reversible pilot motor 30 and reversible slave motor 31.

The pilot motor 30 may be of the same speed but of lesser work capacity than the slave motor 31, and comprises an armature 32 operatively connected to an output shaft 33, and field coils 34 and 36 energizable according to relative voltage phase relationships to cause rotation of the armature 32 in opposite directions or to become motionless as hereinafter will be explained in detail. Such motor may be of the type supplied by the Brown Instruments Division of Minneapolis Honeywell Regulator Company, and known as a balance motor employed in conjunction with a null-balance amplifier as shown in that company's Service Manual 15019M for Class 15 Electronic Instruments.

Motor 31 may be of the well-known "plug reversing" type, and comprises an armature 38 operatively connected to an output shaft 40 and field coils 42 and 44 which are selectively energizable to cause rotation of the armature 38 in opposite directions, respectively.

The circuit means 5 for controlling operation of the motor means 3, including the pilot motor 30 and the slave motor 31, the former directly and the latter indirectly, comprises a null-balance amplifier for controlling the phase relationship between the alternating current voltage supply to the windings 34 and 36 of the pilot motor 30 for starting, stopping, and reversing same according to dictates of two direct current input signals. Such null-balance amplifier 50 may be in the form such as identified as Brown Amplifier 356413 as shown in aforementioned Service Manual for Class 15 Electronic Instruments, No. 15019M, by Brown Instrument Division of Minneapolis Honeywell Regulator Company. In such form the amplifier 50 will compare the direct current control signals at control input terminals 52 and 54 to regulate the phase relationships of alternating current potentials between two pairs of output terminals 56 and 58 connected across windings 34 and 36 of pilot motor 30, respectively.

The null-balance amplifier 50 will respond to equality of D.C. control signals at its input terminals 52 and 54 to establish an in-phase relationship of the alternating current potentials of output terminals 56 and 58 one set relative to the other, to so energize windings 34 and 36 of pilot motor 30 whereby its armature 32 is motionless. Predominance in one direct current control signal at control terminal 52 or 54 over that of the other will cause the alternating current potential at 56 or 58 to lag or lead the other by 90° according to whichever of the two D.C. control signals predominates, and thereby cause such potential as applied to the control windings 34 and 36 of the pilot motor 30 to lag or lead one another and thus effect and control the rotation and direction of rotation of the armature 32.

The circuit 5 further comprises a direct current source 60, such as a 15 volt battery, connected in parallel with a manually-adjustable distance-signifying potentiometer 61 and with a manually adjustable time-signifying potentiometer 62 which in turn is connected in series with an adjustable contact 63 of a speed signifying potentiometer 66 in parallel with said source 60. The adjustable contact 64 of potentiometer 61 is connected to the control terminal 52 of the null-balance amplifier 50, while a similar contact 65 of potentiometer 62 is connected to the control terminal 54 of such amplifier.

The adjustable contact 63 of the speed signifying potentiometer 66 is connected to the speed control shaft 24 of the variable speed transmission means 2, according to a preferred structural feature, through the medium of a shaft 70, pinion 71, ring gear 72 associated with the differential gear mechanism 7, and a pinion 73. It will thus be seen that the position of the adjustable contact 63 of the speed-signifying potentiometer 66 during operation of the variable speed transmission means 2 will correspond to the rotary speed of the output shaft 21, hence to the travel speed of the member X to be actuated, driven by such output shaft.

In accord with a feature of the invention, the operating parameters of the control apparatus are such that the adjustable contact 64 of the distance-signifying potentiometer 61 may be set according to distance that it is desired that the member X is desired to travel, while the adjustable contact 65 of the time-signifying potentiometer 62 may be adjusted to correspond to the time in which it is desired that such member complete such travel.

In accord with an additional structural feature or features of the invention, the output shafts 33 and 40 of the pilot and slave motors 30 and 31, respectively, are coupled for operative connection both with the speed control shaft 24 and with the adjustable contact 63 of the speed-signifying potentiometer 66 through the medium of the differential gear mechanism 7. The shafts 33, 40 are connected to respective alike bevel gears 74 which mate with oppositely-arranged, complementary, bevel gears 75 rotatable about the axes of respective aligned shafts 76 carried by a support member 77 which carries the ring gear 72 at its outer periphery and is journaled for rotation about the axis of the gears 74.

The circuit 6 for initiating operation of the control apparatus and terminating such operation following a preselected period of time comprises a time switch control member 80 which may be in any well-known form including the usual clock motor mechanism (not shown) selectively adjustable by manipulation of an operator's control member 81 and operatively connected to a normally-closed contact 82 to open same following a preselected period of time as determined by adjustment of the operators control member 81.

A contactor relay 83 provided with normally-open contacts 86 and 87, is arranged to be under the control of the normally-closed contact 82 of the time switch control means 80 to effect termination of operation of motor means 1, motor means 3, circuit means 5, etc., in a manner which hereinafter will be set forth in detail, and to respond initially to operation of a control switch such as an operators push-button switch 90 to establish circuit means for energizing these various means, as will be set forth in detail hereinafter.

The circuit means 8 for controlling on-off and reversing operations of the slave motor 31 includes, in general, direction sensing switch means comprising a direction sensing friction member 92 associated with a shaft 127 driven by the output shaft 33 of the pilot motor 30 via reducing gears 125 and 126 and an idler gear 128 which affords rotation of shaft 127 in the same direction as that of shaft 33; direction-controlled movable contact 93 operably connected to the direction sensing member 92 for positioning according to the direction of rotation of the shaft 33; relays 94 and 95 each having a normally open contact 96 and 97, respectively, and a normally closed contact 98 and 99, respectively, arranged to be controlled according to the position of the direction-controlled movable contact 93 in a manner which hereinafter will be set forth in detail.

*Operation*

Assume now that the control apparatus embodying the invention is deenergized, that the member X to be actuated, such as the radioactive source material holder of the aforementioned patent application, Serial No. 777,042, is stationary and that it is desired to effect actuation of such member a preselected distance in a predetermined interval of time. The operator then will effect adjustment of the adjustable contact 64 of the manual-set distance pot 61 of circuit means 5 according to the distance which it is desired that the member X to be actuated is to travel, as well as adjustment of the operator's control member 81 of the time switch control means 80, and of the adjustable contact 65 of the manual-set time pot 62 of circuit means 5, according to the time at which it is desired that the member X is to complete such selected travel. Although shown as separately adjustable in the drawing, since a correlation exists between the position of the adjustable contact 65 of the manual-set time pot 62 and the position of the operator's control member 81 of the time switch control means 80, it will be apparent that such adjustable contact 65 and operator's control member 81 may be mechanically interconnected for simultaneous adjustment by manipulation of a single control knob.

Following such adjustment, the operator will then depress the operator's push-button switch 90, shown in the drawing as associated with the circuit means 6, thereby establishing an energizing circuit for the contactor relay 83 between alternating current source leads 100 and 101 by way of said push-button switch 90 and the normally-closed contact 82 associated with the time-switch control means 80. Such energization of the relay 83 effects closure of its normally-open contacts 86 and 87. Closure of contacts 86 and 87 establishes electrical connection between A.C. lines 102 and 103 with the source leads 100 and 101, respectively.

Connection of the A.C. lines 102 and 103 to the source leads 100 and 101, respectively, by contacts 86 and 87 also effects energization of terminals 58 of the null-balance amplifier means 50 of circuit means 5 and of the winding 36 in pilot motor 30, while connection of A.C. lines 102 and 103, to the motor means 1 effects its operation according to position of the contacts 106 of switch means 107. At the same time, connection of the A.C. line 102 to the source lead 100 by way of contact 86 establishes a stick circuit for the contactor relay 83 by way of the normally-closed contact 82 associated with the time-switch control means 80 which will maintain such contactor relay 83 picked up and its contacts 86 and 87 closed so long as normally closed contact 82 remains closed. Upon establishing such stick circuit for the contactor relay 83, the operator's push-button switch may be allowed to open.

Energization of the motor means 1 will effect turning of the output shaft 21, hence actuation of the member X, through the medium of the variable speed transmission means 2 by operation of the input shaft 11. The rate of turning movement of the output shaft 21, hence rate of movement of the member X relative to the rate of turning movement of the input shaft 11 will be determined according to the position of the control ring 22 lengthwise on the tapered rollers 12 which roll on the inner surface of same as set forth hereinbefore in conjunction with description of operation of the variable speed transmission means 2. Since the rate of travel of the member X is determined by the rate of turning movement of the output shaft 21 which in turn is dependent upon the longitudinal position of the control ring 22, which in turn is determined by the position of the rack 27, hence rotary position of the speed control shaft 24, and since, as set forth hereinbefore, the shaft 70 occupies a rotary position corresponding to that of the speed control shaft 24 by virtue of its connection therewith via the pinion 71, gear 72, and pinion 73 it will be seen that the adjustable contact 63 of the speed pot 66 associated with circuit means 5 will occupy a position corresponding to the speed of rotation of the output shaft 21 and hence of the member X.

If the rate of travel of the member X driven by the output shaft 21 of the variable speed transmission means 2 is such that it will travel its preselected distance according to the distance setting of the adjustable contact 64 of distance pot 61 in a period of time in accord with the setting of the time pot 62, the adjustable contact 63 of the speed pot 66 will occupy a position such that the direct current control circuit for the null-balance amplifier 50 will be in balance; with the direct current voltages appearing at its control terminals 52 and 54 being equal. Such null-balance amplifier 50, in response to equality of voltages at its control terminals 52 and 54, will maintain an in-phase alternating current voltage relationship between its terminals 58 connected to the winding 36 of pilot motor 30 and its terminals 56 connected to winding 34 of said pilot motor via switch 137. Such in-phase relationship between the alternating current voltages appearing in its windings 34 and 36 will render the armature 32 of the pilot motor 30 motionless, its output shaft 33 remains stationary, while, by virtue of the static condition of the shafts 33 and 127 with respect to the direction sensing friction member 92, the direction-controlled movable contact 93 operatively connected to such friction member will be in a previously-assumed position, which may be neutral as shown in the drawing. The relays 94 and 95 remain deenergized with the windings 42 and 44 of slave motor 31, the armature 38, together with its output shaft 40, remains motionless. Correspondingly, the differential gear mechanism 7 will remain motionless, as accordingly will the speed control shaft 24 associated with the variable speed transmission means 2 and the shaft 70 operatively connected to the adjustable contact 63 of speed pot 66.

If, however, during operation of the motor 1, the output shaft 21, hence the member X actuated thereby, is being driven at a rate of speed greater than that required to satisfy the setting of time and distance pots 62, 61 of circuit 5, the position of the adjustable contact 63 of the speed pot 66 will occupy a position corresponding to that of the speed control shaft 24 and which causes the direct current voltage at control terminal 54 of the null-balance amplifier 50 to predominate over the voltage at control terminal 52. The null-balance amplifier 50 will respond to such preponderance in voltage at its control terminal 54 to cause the alternating current voltage applied to lines 110 and 111, hence winding 34 of the pilot motor 30, to lead by 90° the alternating current potential appearing in lines 102 and 103 applied across the winding 36 of such pilot motor. The pilot motor 30 will then respond to cause its output shaft 33, hence shaft 127, to rotate in a clockwise direction (as viewed in the direction of arrow 121), and such rotation of the shaft 127 through the medium of the direction-sensing friction member 92 will immediately actuate the direction-controlled movable contact 93 in an upwardly direction, as viewed in the drawing, into contact with a fixed contact 122 which establishes an energizing connection for the relay 94 across the A.C. lines 102 and 103 as well as a similar connection for the winding 42 of the slave motor 31 by way of the normally-closed contact 99 of the relay 95. Energization of relay 94 closes its normally-open contact 96 and establishes a stick circuit for such relay in connection across A.C. lines 102 and 103. Such energization of relay 94 also opens its normally-closed contact 98, for reasons which hereinafter will become apparent. Energization of winding 42 of the slave motor 31 causes its armature 38 and output shaft 40, together with the respective gears 74 of the differential gear mechanism 7 to rotate in the same direction as the output shaft 127, or namely in a clockwise direction as viewed in the direction of arrow 121 in the drawing.

Rotation of the shafts 40 and 127 operatively connected to respectively bevel gears 74 in the differential gear mechanism 7 will cause, through the medium of bevel gears 75 and shafts 76, the support member 77 to rotate in a clockwise direction as viewed in the direction of the arrow 121 in the drawing about the axis of shafts 40 and 127, thereby causing the pinions 71 and 73 engaging the gear 72 attached to support member 77 to rotate in clockwise and counterclockwise directions, respectively, as viewed in the direction of arrow 120 in the drawing. Such rotation of the pinion 73 will cause the speed control shaft 24 to drive the rack 27 and control ring 22, through the medium of pinion 26, in the right-hand direction as viewed in the drawing to slow down the output shaft 21 and member (not shown) driven by same, while the shaft 70 associated with pinion 71 is simultaneously adjusted to effect a movement of the adjustable contact 63 of speed pot 66 associated with circuit means 5 in a right-hand direction in behalf of establishing a balance between the direct current control voltages appearing at terminals 52 and 54 of the null-balance amplifier 50. During the simultaneous rotation of the two shafts 127 and 40 associated with pilot motor 30 and slave motor 31, respectively, in the same direction as set forth above, due to the speed reducing action of the gears 125 and 126, the bevel gear 74 attached to shaft 127 will travel slower than the bevel gear 74 attached to shaft 40 associated with motor 31. Consequently, there will be a rotary movement of the bevel gears 75 about the axes of their respective shafts 76 while the support member 77, including gear 72, is caused to turn rapidly in the aforesaid clockwise direction, for example. A suitable speed-reducing, force-multiplying ratio of the two gears 125 and 126 has been found to be such as thirty-to-one, that is the shaft 127 will be turned by the pilot motor 30 at a speed which is one-thirtieth as fast as that of the shaft 33.

From the foregoing it will be apparent that responsive to simultaneous operation of the pilot motor 30 and slave motor 31 under control of circuit 5, the speed control shaft 24 associated with variable speed transmission means 2 and the adjustable contact 63 associated with the speed pot 66 of circuit 5 will be adjusted rapidly through the medium of the differential gear mechanism 7, and due to such rapid adjustment, the position of the speed control shaft 24 and adjustable contacts 63 will be advanced beyond their positions corresponding to attainment of the exact speed of the output shaft 21 which is commensurate with the settings of time and distance pots 62 and 61 of circuit 5. Due to such over-shooting of the position of adjustable contact 63, the direct-current voltage appearing at control terminal 52 will be made to preponderate over that appearing at control terminal 54 of the null-balance amplifier 50 and this will cause the null-balance amplifier 50 to change the phase relationship between the A.C. voltages appearing at terminals 58 relative to terminals 56 such that the alternating current voltage appearing in winding 34 of the pilot motor 30 will lag 90° behind the alternating current voltage appearing in its winding 36.

The pilot motor immediately will respond to cause its output shaft 33, hence shaft 127 and respective bevel gear 74, to reverse direction of rotation, and such reversal in direction of rotation of the shaft 127, through the medium of direction-sensing friction member 92, will cause the direction-controlled movable contact 93 to leave contact 122 and to engage fixed contact 124. This establishes an energizing connection of the coil of relay 95 across the A.C. lines 102 and 103 which causes same to open its normally-closed contact 99 to thereby deenergize the winding 42 of slave motor 31 and terminate its operation, while at the same time, energization of the winding of relay 95 also causes it to close its normally-open contact 97 and establish a stick circuit between A.C. lines 102 and 103 for maintaining the winding of such relay energized so long as such A.C. lines remained connected to the source leads 100 and 101. Termination of operation of slave motor 31 tends to lock its output shaft 40, hence the respective bevel gear 74 attached thereto, against further rotation while the bevel gear 74 secured for rotation with the shaft 127 is slowly turned by motor 30 in a direction opposite to that in which it previously was being turned, through the medium of gears 126 and 128 and 125 and the reversely-rotating shaft 33.

The slowly and reversely-rotating bevel gear 74 secured to shaft 127 thus will be caused to turn in a counterclockwise direction, as viewed in the direction of arrow 121 in the drawing, and thus cause the bevel gears 75 to roll around the bevel gear 74 associated with the non-rotating output shaft 40 of slave motor 31. This travel of gears 75 around the locked gear 74 will cause the support member 77 and associated gear 72 to reverse in direction of rotation, that is, to move counterclockwise as viewed in the direction of arrow 121, and cause, through the medium of pinions 71 and 73, the speed control shaft 24 to slowly return the rack 27 and control ring 22 for the proper speed position compatible with the setting of time and distance pots 62 and 61 of circuit 5, while the adjustable contact 63 of speed pot 66 is simultaneously slowly returned by shaft 70 toward its D.C. control-circuit-balancing position. Once the direct current control voltages appearing at control terminals 52 and 54 have been equalized as a result of the slow-return balancing-movement of the adjustable contact 63, as effected by operation of the pilot motor 30, the null-balance amplifier 50 will establish an in-phase relationship between the alternating current voltages appearing at its terminals 56 and 58, hence effect an in-phase relationship between the alternating current voltages appearing across windings 34 and 36 of pilot motor 30, which will respond to terminate its operation.

The setting of the speed control shaft 24 then will remain fixed for the duration of the preselected period of actuation of the member X driven by the output shaft 21.

From the foregoing it will be apparent that, if, upon starting of the apparatus, the speed of operation of the member X being actuated by the output shaft 21 of the variable speed transmission means 2 is slower than that required to satisfy the setting of the time and distance pots 62, 61 of circuit means 5, then the null-balance amplifier 50 will respond to the direct current voltage conditions appearing at its control terminals 52 and 54 to establish the proper voltage phase relationships in the windings 34 and 36 of pilot motor 30 to bring same into operation in the proper direction for causing operation of the slave motor 31 in the same direction responsively to initial movement of the direction-controlled movable contact 93 first into engagement with contact 124 for initially energizing relay 95. Following this, the simultaneous operation of both the pilot motor 30 and the slave motor 31 will effect movement of the support member 77 and gear 72 in the proper direction for rapidly moving the contact ring 22 of the variable speed transmission means 2 and movement of the adjustable contact 63 of the speed pot 66 in a direction for rapid compensating-adjustment of the speed of output shaft 21. Subsequently, the resultant over-shooting in position of control ring 22 and adjustable contact 63 of speed pot 66, in causing reverse unbalance of the D.C. voltage control signals applied to terminals 52 and 54 of the null-balance amplifier 50, will cause reversal of the pilot motor 30 with consequent shifting in position of the contact 93 to terminate operation of the slave motor 31 by the slow return movement of the speed control shaft 24 and adjustable contact 63 of the speed pot 66 to the proper compatible speed-setting position through operation of the differential gear mechanism 7 by the pilot motor 30 via speed-reducing gears 125 and 126.

Once having thus established the proper setting of the speed control shaft 24 whereby the speed at which the member X operated by output shaft 21 is caused to travel a preselected distance in a predetermined period of time, the motor means 1 will continue to operate until the lapse of such period of time, whereupon, the time switch control means 80 will effect opening of the normally-closed contact 82. The energizing circuit for the winding of contactor relay 83 is thus disestablished and its contacts 86 and 87 are opened to disconnect the A.C. lines 102 and 103 from the source leads 100 and 101, respectively, with resultant deenergization of relays 94 and 95, the null-balance amplifier 50, windings 32 and 34 of pilot motor 30, and motor means 1 driving the member X.

Deenergization of relays 94 and 95 will cause return of the contacts 96, 98 and 97, 99 to the positions in which they are shown in the drawing.

From the foregoing it will be apparent that such automatic control in the speed of operation of the member X to be actuated by the output shaft 21 of the variable speed transmission means 2 will be effected irrespective of direction of movement of such member as determined by the direction of movement of the output shaft 21, and such direction may be selected according to position of the contacts 106 of the motor-reversing switch 107 which is interposed between the leads for such motor and the A.C. lines 102 and 103.

Time delay switches (not shown) of suitable well-known form may be inserted in lines 102, 103 and lines 110, 111 between the amplifier 50 and motors 1, 30 and 31 to afford time for such amplifier to warm up before the motors are started following closure of the switch 90 as described hereinbefore, or such amplifier otherwise suitably energized prior to such closure of switch 90.

The invention is not to be restricted necessarily to the specific structural details or arrangement of parts herein set forth, as various modifications thereof may occur to those skilled in the art without departing from the sprit and scope of this invention.

I claim as my invention:

1. Apparatus for controlling the travel of a member to be actuated preselected distances in preselected periods of time, comprising motor means for actuating said member, adjustable speed control means for regulating rate of actuation of said member by said motor means, means including operator-controlled independently-adjustable time and distance selector members for adjusting said adjustable speed control means according to preselected settings respective to travel time and distance desired for said member, whereby the travel speed of said member is automatically regulated to assure its travel a selected distance during a selected time in accord with such preselected settings, and timing means for terminating operation of said member by said motor means following expiration of a period of time corresponding to the aforesaid travel time.

2. Apparatus for controlling the travel of a member to be actuated preselected distances in preselected periods of time comprising first motor means for actuating said member, adjustable speed control means for regulating rate of actuation of said member by said first motor means, second motor means for adjusting said adjustable speed control means, and circuit means including operator-controlled independently-adjustable time and distance selector members for controlling operation of said second motor means according to compatability of the actuated speed of said member with respect to preselected travel time and distance control settings, whereby the speed of said member is automatically regulated to assure its travel a previously selected distance within a previously selected period of time in accord with the aforesaid settings.

3. Apparatus for controlling the travel speed of a member to be actuated, comprising drive motor means for actuating said member, adjustable speed control means for regulating rate of actuation of said member by said drive motor means, reversible pilot motor means, slave motor means, differential gear means establishing operative connection of both aforesaid pilot and slave motor means to said adjustable speed control means whereby the latter may be adjusted rapidly by operation of both pilot and slave motor means or slowly by operation of said slave motor means alone, speed-reducing mechanism interposed between said pilot motor means and said adjustable speed control means, means controlling direction of operation of said pilot motor means according to whether the actuated speed of said member is greater or less than a desired value, and means controlled according to direction of rotation of said pilot motor means to initiate operation of said slave motor means upon initiation of operation of said pilot motor means and to terminate operation of said slave motor means upon reversal in direction of operation of said pilot motor means.

References Cited in the file of this patent

UNITED STATES PATENTS

| | | |
|---|---|---|
| 2,464,275 | Trofimov | Mar. 15, 1949 |
| 2,795,748 | Wellington et al. | June 11, 1957 |